L. GATHMANN, DEC'D.
O. G. FOLEY, ADMINISTRATRIX.
METHOD OF DRYING SMOKELESS POWDER AND RECOVERING SOLVENTS THEREFROM.
APPLICATION FILED FEB. 17, 1917.
1,289,150.
Patented Dec. 31, 1918.
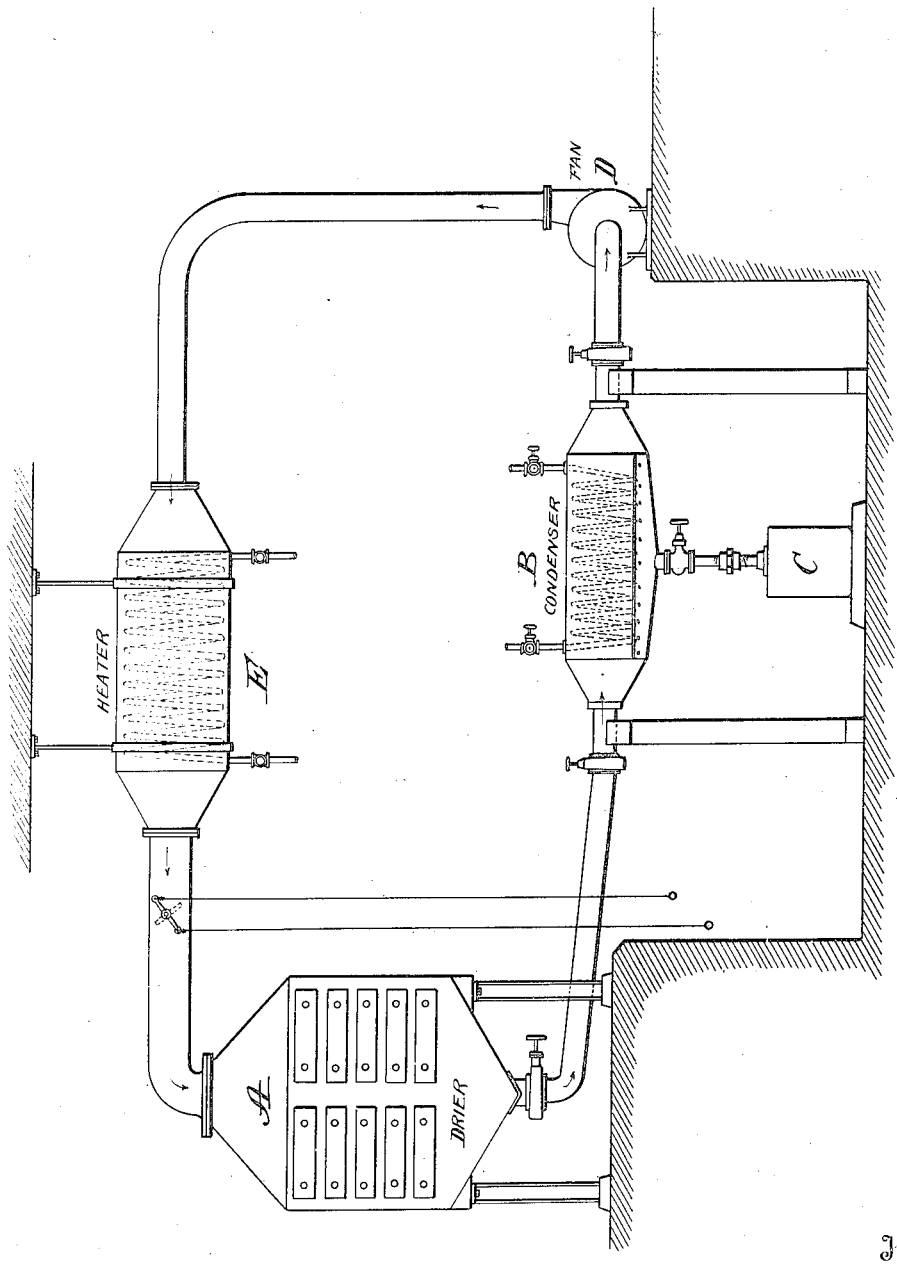

UNITED STATES PATENT OFFICE.

LOUIS GATHMANN, OF WASHINGTON, DISTRICT OF COLUMBIA; OLGA GATHMANN FOLEY ADMINISTRATRIX OF SAID LOUIS GATHMANN, DECEASED.

METHOD OF DRYING SMOKELESS POWDER AND RECOVERING SOLVENTS THEREFROM.

1,289,150.

Specification of Letters Patent. Patented Dec. 31, 1918.

Application filed February 17, 1917. Serial No. 149,318.

*To all whom it may concern:*

Be it known that I, LOUIS GATHMANN, a citizen of the United States, residing at Washington, in the District of Columbia, have invented certain new and useful Improvements in Methods of Drying Smokeless Powder and Recovering Solvents Therefrom, of which the following is a specification.

This invention has relation to the art of drying smokeless powder and other substances and recovering the solvents therefrom. In this art it has been common to make use of a closed circuit, comprising, generally speaking, a drying chamber, means to heat the air in the circuit to a vaporizing temperature, means to cause the air to circulate in the circuit, and thereby vaporize the moisture or solvents in the substances or materials contained in the drying chamber, and a condenser to condense the vapors as they are evolved from the substances or materials to be dried.

In those processes which are based upon the circulation of the drying medium in a closed circuit and the condensing of the vapors, no means have been provided to produce a gradual decreasing cause for condensing the vapors or solvents. My method consists in gradually raising the temperature in the condenser so as to prevent the condensing of all the solvents or vapors, with the object of keeping the surface of the materials in the drying chamber, moist, so as to prevent, as in the present method employed, a bottling-up of the solvents in the smokeless powder. By my method the powder is dried in a much shorter period of time than by the method now employed, a larger percentage of solvents will be recovered, and a more reliable and stable powder produced.

Any suitably organized apparatus may be used in carrying out my invention, and a convenient form of such apparatus is illustrated in the accompanying drawing, in which A. indicates the chamber in which the material is located for drying; B. indicates the refrigerator in which the solvents are condensed and drawn off into a proper receptacle C. D. is the fan which causes the air to circulate through the apparatus; E. is the heater, for heating the air in circulation before it again enters the chamber A., in which the materials are stored.

The operation is as follows: The atmosphere contained in the apparatus is continuously circulated by the fan D. The air is heated to the required temperature in the heater E; from there forced through the dryer A. where the smokeless powder or other material is located, vaporizing some of the solvents, hence sent to the refrigerator B. where a part of the vapors are condensed. In the beginning of the operation the refrigerator is kept at a low temperature so as not to return too much of the solvents while there is still ample moisture contained in the material to prevent surface drying. However, the temperature of the refrigerator is gradually raised, either by hand manipulation or automatically, as the materials become dryer, so that in the latter part of this operation, gradually a smaller percentage of the vaporized solvent is condensed; that is to say, in a comparatively short period according to the material to be dried, even 50% or more of the vapors may be returned and circulated and still by this means a larger part of the solvents are recovered in a shorter time than by methods now in use. By my method I prevent a bottling-up of solvents in the powder causing interior pressure in the powder which makes it brittle and unreliable. It is obvious, while I show in the drawings that the air current has a downward draft through the chamber in which the materials are dried, it may be reversed upwardly or forced in any desired direction.

Having thus described my invention, what I claim as new herein and desire to secure by Letters Patent, is:

The method of drying in a drying plant in which the drying compartment is provided with connections whereby the atmosphere is caused to flow in a closed circuit from said compartment through a condensing compartment and then in contact with means for imparting heat, said method consisting in regulating the condensation by gradually increasing the temperature in the condenser as the drying operation progresses so that in the latter part of the operation a smaller percentage of the vapors are condensed than in the beginning of the operation.

In testimony whereof I affix my signature.

LOUIS GATHMANN.